United States Patent [19]
Pareja

[11] 3,878,861
[45] Apr. 22, 1975

[54] UNITIZED VALVE ASSEMBLY
[75] Inventor: Ramon Pareja, Minneapolis, Minn.
[73] Assignee: Lear Siegler, Inc., Santa Monica, Calif.
[22] Filed: Sept. 10, 1973
[21] Appl. No.: 395,945

[52] U.S. Cl. ............................................ 137/543.17
[51] Int. Cl. ............................................. F16k 15/02
[58] Field of Search................ 137/543.17; 417/536

[56] References Cited
UNITED STATES PATENTS
| | | | |
|---|---|---|---|
| 797,739 | 8/1905 | Meel | 137/543.17 X |
| 1,959,644 | 5/1934 | Richardson | 137/543.17 X |
| 3,238,890 | 3/1966 | Sadler et al. | 417/536 |

FOREIGN PATENTS OR APPLICATIONS
| | | | |
|---|---|---|---|
| 841,303 | 2/1939 | France | 137/543.17 |

*Primary Examiner*—William R. Cline

[57] ABSTRACT

A unidirectional flow valve assembly having a housing, a spring biased poppet, and a seat formed therewithin for receiving the poppet in seated relationship thereagainst. An abutment surface is formed within the housing in order to limit the extent of travel of the spring biased poppet away from the seat, with the limit of travel being such that the biasing spring is never compressed to its solid height.

5 Claims, 4 Drawing Figures

PATENTED APR 22 1975  3,878,861

UNITIZED VALVE ASSEMBLY

BACKGROUND OF THE INVENTION

The present invention relates generally to a unidirectional flow valve assembly, and more particularly to a check valve assembly which comprises a housing, a spring biased poppet, and a poppet seat in the form of a spherical zone. The housing is arranged so as to limit the extent of flow of the poppet to such an extent that biasing spring never is compressed to its solid height.

Unidirectional flow valves or check valves are in common usage in a wide variety of applications. One common application is in combination with a positive displacement pump wherein an inlet check and an outlet check are employed for each cylinder. One specification application for the unitized valve assembly of the present invention is in the structure shown in U.S. Pat. No. 3,238,890, entitled "PISTON-TYPE PUMP," dated Mar. 8, 1966, by Harry J. Sadler et al. In such a pump assembly, it will be observed that the individual pistons are each provided with an inlet check and an outlet check, with the structure of the present invention being adapted for use in such an assembly.

Regardless of the application to which the check valves are employed, the efficiency of the system will depend to a significant extent upon the sealing characteristics of the valve. In the manufacture of this type of valve, the selection of valve springs becomes an important factor, inasmuch as conventional valve design has normally required that high quality springs be employed without substantial angular deflections from one end to the other. In a conventional check valve, the sealing characteristics deteriorate when the poppet spring is not square. By "Square" it is meant that the opposed surfaces of the spring are substantially normal to the spring axis.

When a spring is not square, the poppet which is being biased by the spring will seat against the valve seat at an angle other than normal to the seat. In a chamffered seat, leakage will occur due to the seat appearing elliptical to the surface of the poppet.

SUMMARY OF THE INVENTION

In accordance with the present invention, spring imperfections are tolerated without interfering with the effectiveness of the seal. In this connection, the valve seat is arranged as a spherical zone so as to accommodate the poppet in a variety of sealing contacts, which include sealing contacts in which the poppet axis is not normal to the axis of the seat. As a further feature of the present invention, the outer peripheral surface of the poppet is arranged as a complimentary spherical zone, so as to enhance the sealing characteristics between the poppet and the seat.

Therefore, it is a primary object of the present invention to provide an improved unitized valve assembly for application as a check-valve wherein the seating surface to receive the spring biased poppet is arranged as a spherical zone.

It is a further object of the present invention to provide an improved check valve assembly which utilizes a seat formed as a spherical zone, and which further utilizes a poppet having a peripheral sealing surface which is arranged as a complimentary spherical zone.

It is yet a further object of the present invention to provide an improved check valve assembly which utilizes a spring biased poppet, and which is provided with means for limiting the stroke of the poppet so as to prevent compression of the spring to its solid height.

It is yet a further object of the present invention to provide an improved check valve assembly which utilizes a spring biased poppet, and wherein means are provided for limiting the stroke of the poppet without adversely affecting the flow characteristics of the structure.

Other and further objects of the present invention will become apparent to those skilled in the art upon a study of the following specification, appended claims and accompanying drawing.

DESCRIPTION OF THE PREFERRED EMBODIMENT

Figure 1:
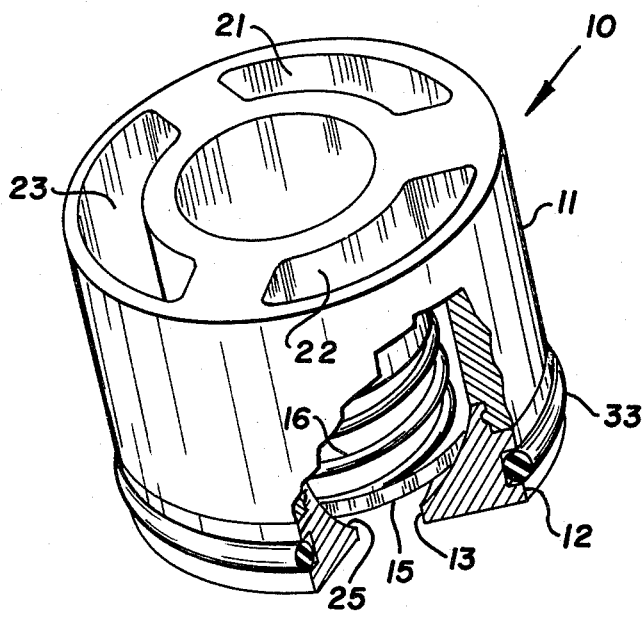
FIG. 1 is an isometric view of the unitized check valve assembly prepared in accordance with the present invention, with a portion of the housing being shown cut away.
Figure 2:
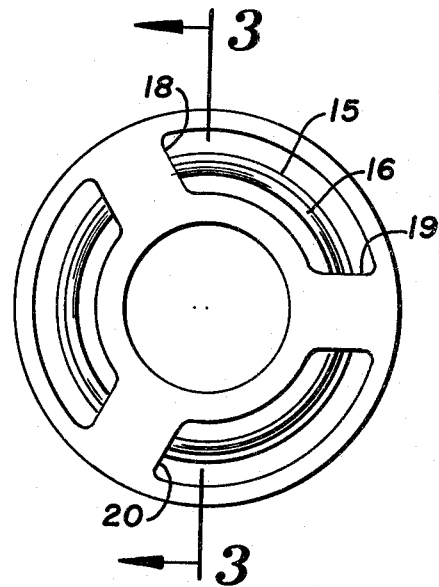
FIG. 2 is a top plan view of the improved valve assembly.

In accordance with the preferred modification of the present invention, and with particular attention being directed to the drawing, the unidirectional flow valve assembly generally designated 10 includes a housing which comprises a generally cylindrical casing 11 together with an annular seat segment or portion 12. The housing is provided with an inlet port at one end, as shown at 13, and an outlet port at the other end, as illustrated at 14. The housing further provides a means for retaining poppet 15 along with its biasing spring 16.

The casing 11 is provided with a generally cylindrical sleeve as shown at 17, with the sleeve being supported within the housing by spider support arms 18, 19, and 20. These support arms provide for the formation of segmental annular flow channels therebetween such as are illustrated at 21, 22 and 23. Sleeve 17 terminates in an abutment surface as illustrated at 24, with the purpose of abutment surface 24 being explained more fully hereinafter.

As is apparent in the drawings, housing segment 12 is provided with an annular valve seat surface as at 25, with this surface being in the form of a spherical zone. Poppet 15 is resiliently biased into contact with surface 25 by spring 16, the outer peripheral edge surfaces of poppet 15 preferably being in the form of a complimentary spherical zone, such as is illustrated at 27. This arrangement of parts permits positive and effective seating of the poppet against the seat independent of the precise angle of attack existing between poppet 15 and seat 25. For example, if poppet 15 is canted relative to the surface of seat 25, effective sealing will nevertheless occur, because of the identity of surfaces and the ability of the spherical segments to make sealing contact regardless of this immediate disposition.

Figure 3:
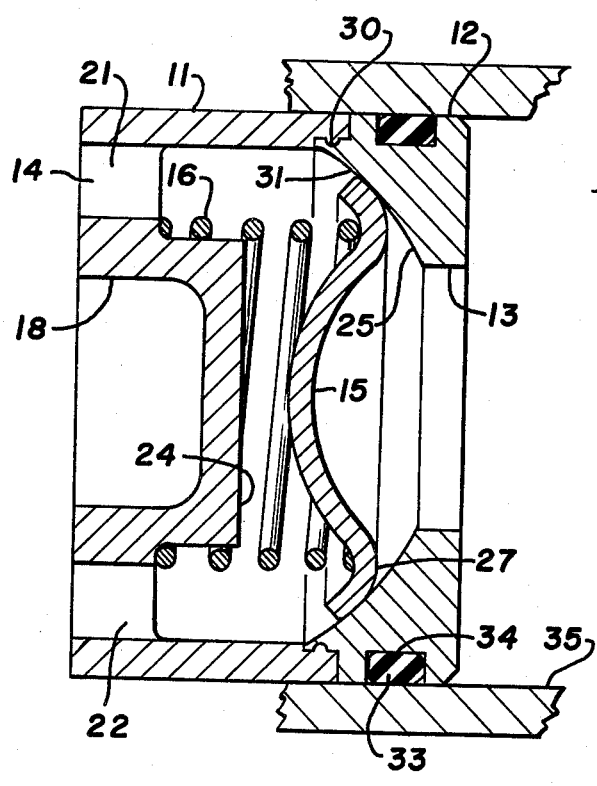
FIG. 3 is a sectional view taken through the diameter of the valve assembly, specifically along the line and in the direction of arrows 3—3 of FIG. 2, and illustrating the poppet in seated disposition against the contoured seat.
Figure 4:
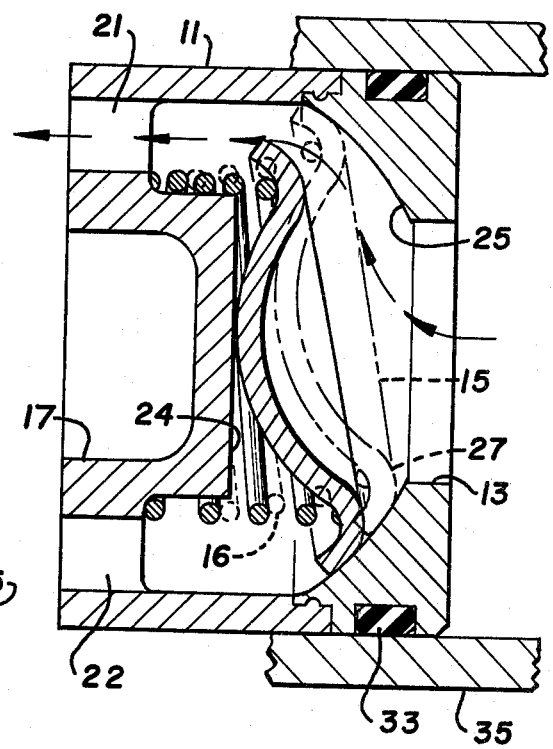
FIG. 4 is a view similar to FIG. 3 and illustrating, in solid, the disposition of the poppet when open, and illustrating, in phantom, the sealing disposition of the poppet which occurs when the biasing spring has an unusual characteristic or imperfection.

Attention is now directed to FIGS. 3 and 4 of the drawing wherein the relationship of spring 16 is shown relative to the opening and closing of poppet 15 against seat 25. As is apparent on the upper portion of FIG. 4, spring 16, while compressed to the fullest extent by poppet 15, does not become solid, since the distance between seat 25 and abutment 24 is insufficient to permit compression of spring 16 into its solid height. In order to better enable the structure to function normally, the contacting surface of the poppet 15 is convex toward abutment surface 24, thus creating a more uniform compression of spring 16 should the poppet become canted relative to the axis of the valve housing.

Turning now to another feature of the unitized valve assembly, it will be observed that the housing 11 is provided with an inwardly projecting rib as at 30, with this rib mating with a complimentary groove 31 formed in housing segment 12. Furthermore, "O" ring 33 is utilized to form an operational seal between groove 34 and outer housing member 35, such as, for example, the flow channel of a reciprocating piston pump such as is disclosed in U.S. Pat. No. 3,238,890.

Depending upon the immediate application for the valve assembly, the materials of construction may be, for example, steel, stainless steel, other ferrous alloys, bronze, synthetic plastics, and the like.

I claim:

1. In unidirectional flow valve means including a housing, a valve seat, and a spring biased poppet;
    a. housing means including a generally cylindrical casing with the housing having an inlet port at one end and an outlet port at the other end, and poppet retaining cage means disposed between said inlet and outlet ports;
    b. a generally cylindrical sleeve means disposed substantially coaxially within said housing means and having a poppet abutment surface arranged along the inner end thereof;
    c. spider support arms extending radially outwardly from said sleeve means and securing said sleeve means to said housing means, and defining a plurality of segmental annular flow channels therebetween;
    d. valve seat means disposed inwardly of and adjacent said inlet port and having a seat portion defining an annulus in the form of a spherical segmental zone, with said seat portion having a seating surface disposed in opposed concave relationship to said outlet port and being spaced from said abutment surface by a certain predetermined distance;
    e. poppet means disposed within said housing and arranged for retention between said abutment surface and the seating portion of said valve seat means, and resilient spring means in contact with said poppet means and normally biasing said poppet means into sealing contact with said seating portion, said poppet means having a body in the form of a disc with a central base abutment surface contacting portion and with a seating periphery arranged therearound for seating contact with the seat portion of said valve seat; said poppet being formed generally as a segment of a spherical shell with a central portion convex to said abutment surface and with the outer peripheral edge portion of said poppet being concave to said abutment surface; and
    f. said spring means having a solid height less than that height reached upon compression thereof with the abutment surface contacting portion of said poppet in contact with said abutment surface.

2. The unidirectional flow valve means as defined in claim 1 being particularly characterized in that the base abutment contacting surface of said poppet is convex toward said abutment surface.

3. The unidirectional flow valve means as defined in claim 1 being particularly characterized in that said valve seat means includes a body having an axial projection with a peripheral rib member formed on the outer surface therearound for mating contact with a complimentary inwardly directed rib member formed on said generally cylindrical casing.

4. The unidirectional flow valve means as defined in claim 3 being particularly characterized in that an annular seal means is formed around the outer periphery of said valve seat means.

5. The unidirectional flow valve means as defined in claim 1 being particularly characterized in that the outer periphery of said poppet is a spherical segmental zone having an outer convex radius complimentary to and mating with the concave radius of said valve seat.

* * * * *